(12) United States Patent
Park et al.

(10) Patent No.: US 6,967,906 B2
(45) Date of Patent: Nov. 22, 2005

(54) CIRCUIT AND METHOD FOR DETECTING MIRROR SIGNAL FOR OPTICAL DISC APPARATUS

(75) Inventors: Sang-yeal Park, Gyeonggi-do (KR); Chang-jin Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 10/439,310

(22) Filed: May 16, 2003

(65) Prior Publication Data
US 2004/0008592 A1  Jan. 15, 2004

(30) Foreign Application Priority Data
Jul. 5, 2002   (KR) ............................... 2002-38878

(51) Int. Cl.[7] ........................................... G11B 21/08
(52) U.S. Cl. ............................. 369/30.18; 369/124.15
(58) Field of Search .......................... 369/30.18, 30.1, 369/30.11, 53.2, 53.22, 53.31, 53.32, 59.15, 369/59.17, 47.14, 124.11, 124.15

(56) References Cited

U.S. PATENT DOCUMENTS

| | | | | |
|---|---|---|---|---|
| 4,385,328 A | * | 5/1983 | Tanaka | 360/46 |
| 5,396,477 A | * | 3/1995 | Matsumoto et al. | 369/44.28 |
| 5,497,361 A | * | 3/1996 | Mita et al. | 369/47.18 |
| 5,796,685 A | * | 8/1998 | Noda et al. | 369/44.28 |
| 5,841,751 A | * | 11/1998 | Komazaki et al. | 369/53.33 |
| 6,147,941 A | * | 11/2000 | Kumagai | 369/44.26 |
| 6,735,162 B2 | * | 5/2004 | Armitage et al. | 369/124.11 |
| 6,762,982 B2 | * | 7/2004 | Armitage | 369/47.25 |
| 6,807,134 B2 | * | 10/2004 | Nakajima et al. | 369/47.35 |
| 2003/0152000 A1 | * | 8/2003 | Yamanoi et al. | 369/53.22 |
| 2004/0013057 A1 | * | 1/2004 | Aoe et al. | 369/44.35 |
| 2004/0047250 A1 | * | 3/2004 | Yamanoi et al. | 369/44.34 |

FOREIGN PATENT DOCUMENTS

| | | | | |
|---|---|---|---|---|
| EP | 1-237154 A2 | * | 4/2002 | 369/124.15 |
| JP | 9-128761 | | 5/1997 | |
| JP | 2000-187851 A | * | 7/2000 | 369/30.1 |

* cited by examiner

Primary Examiner—Tan Dinh
(74) Attorney, Agent, or Firm—Stein, McEwen & Bui, LLP

(57) ABSTRACT

A circuit and a method of detecting a mirror signal for an optical disc apparatus, the method includes detecting a bottom envelope from a radio frequency signal and providing a bottom envelope signal thereof, amplifying the bottom envelope signal according to a center level of the bottom envelope signal, and comparing the amplified bottom envelope signal with a predetermined comparison voltage to detect the mirror signal.

32 Claims, 10 Drawing Sheets

CIRCUIT AND METHOD FOR DETECTING MIRROR SIGNAL FOR OPTICAL DISC APPARATUS

CROSS-REFERENCE TO RELATED APPLICATIONS

This application claims the benefit of Korean Patent Application No. 2002-38878, filed on Jul. 5, 2002, in the Korean Intellectual Property Office, the disclosure of which is incorporated herein by reference.

BACKGROUND OF THE INVENTION

1. Field of the Invention

The present invention relates to a circuit and a method of detecting a mirror signal for an optical disc apparatus, and more particularly, to a circuit and a method of accurately detecting a mirror signal during a high-speed seek or a seek, for a high density disc or a poor quality disc.

2. Description of the Related Art

Generally, in an optical disc apparatus which reproduces data recorded on an optical disc, signals generated when a servo jumps tracks to seek a predetermined position include a track cross signal and a mirror signal. The number of tracks is counted using these two signals. Also, the velocity of seeking a track is controlled and the accurate position of the track is sought by using a phase difference between these two signals.

FIG. 1 shows a block diagram of a conventional circuit which detects a mirror signal for an optical disc apparatus. Referring to FIG. 1, a mirror signal detecting circuit 20 selects an RFSUM signal from a signal picked up by a pickup 10, detects a mirror signal by using the RFSUM signal, and supplies the mirror signal to a servo processor 30.

The mirror signal detecting circuit 20 includes an RFSUM signal selector 21, a top envelope detector 22, a bottom envelop detector 23, a top holding unit 24, a bottom holding unit 25, an amplifier and low-pass filter (AMP & LPF) 26, a comparison voltage determiner 27, and a comparator (COMP) 28.

The RFSUM signal selector 21 selects the RFSUM signal. The top envelope detector 22 detects a top envelope of the RFSUM signal. The bottom envelope detector 23 detects a bottom envelope of the RFSUM signal. The top holding unit 24 detects a top level of the top envelope. The bottom holding unit 25 detects a bottom level of the bottom envelope. The AMP & LPF 26 amplifies and low-pass filters the bottom envelope. The comparison voltage determiner 27 determines a comparison voltage. The comparator 28 compares an output of the AMP & LPF 26 with the comparison voltage to output a mirror signal.

The operation of the mirror signal detecting circuit 20 shown in FIG. 1 will be described with reference to FIGS. 2A–2F.

The RFSUM signal selector 21 receives a signal picked up by the pickup 10 and provides the signal in a form of an RFSUM signal shown in FIG. 2A to the top envelope detector 22 and the bottom envelope detector 23. The top envelope detector 22 detects a top envelope of the RFSUM signal and outputs a top envelope signal shown in FIG. 2B. The bottom envelope detector 23 detects a bottom envelope of the RFSUM signal and outputs a bottom envelope signal shown in FIG. 2C. The top holding unit 24 holds the top envelope signal to detect a top level and outputs a top hold signal shown in FIG. 2D. The bottom holding unit 25 holds the bottom envelope signal to detect a bottom level and outputs a bottom hold signal shown in FIG. 2E.

The bottom envelope signal, shown in FIG. 2C, output from the bottom envelope detector 23 is input to the AMP & LPF 26. The bottom hold signal, shown in FIG. 2E, output from the bottom holding unit 25 is input as a reference voltage level to the AMP & LPF 26. The AMP & LPF 26 amplifies and low-pass filters the bottom envelope signal based on the bottom hold signal. At the same time, the comparison voltage determiner 27 controls the top hold signal and the bottom hold signal output from the top holding unit 24 and the bottom holding unit 25 at a predetermined level, respectively, and provides the predetermined level as a comparison voltage of the comparator 28, i.e., a slice level. The comparator 28 compares a voltage output from the AMP & LPF 26 with the comparison voltage determined by the comparison voltage determiner 27 and provides a mirror signal of a digital signal shown in FIG. 2F to the servo processor 30.

In a case where a high density disc or a poor quality disc (a disc that is deflected, eccentric, tilted, has a defect, or the like) is used, the high density disc or the poor disc may be defocused or degraded. In this case, where a seek operation is performed, a deteriorated RFSUM signal is generated as shown in FIGS. 3A through 3D. FIGS. 3A and 3B show the actual waveform of an RFSUM signal deteriorated where a disc is deflected and tilted, FIG. 3C shows the actual waveform of an RFSUM signal deteriorated by fingerprints, and FIG. 3D shows the actual waveform of an RFSUM signal deteriorated due to defects of a disc.

A bottom envelope signal also deteriorate s due to the deteriorated RFSUM signal, i.e., the intensity of the bottom envelope signal is reduced and inconstant. Accordingly, a glitch occurs where the comparator 28 generates a digital signal (logic "high" or logic "low"), and therefore the duty cycle is distorted. As a result, an accurate seek is difficult. To solve these problems, the AMP & LPF 26 has to perform a proper signal amplification and a low-pass filtering. However, since the glitch cannot be completely removed only by a low-pass filtering, the comparator 28 has to properly control the hysteresis and the level of the comparison voltage.

In other words, where a deteriorated RFSUM signal shown in FIG. 4A passes through the top envelope detector 22 and the top holding unit 24, a top envelope signal and a top hold signal are generated as shown in FIG. 4B. Where the deteriorated RFSUM signal passes through the bottom envelope detector 23 and the bottom holding unit 25, a bottom envelope signal and a bottom hold signal are generated as shown in FIG. 4C. The AMP & LPF 26 amplifies the bottom envelope signal according to the voltage level of the bottom hold signal. The comparator 28 slices the amplified bottom envelope signal to a proper reference voltage (slice level) determined by the comparison voltage determiner 27 to detect a mirror signal MIRR.

However, where the bottom envelope signal is low, the bottom envelope signal has to be amplified by a high amplification degree. Where a difference in the bottom envelope signal occurs due to the deviation of a reflectance, depending on types of discs, the amplification degree of the AMP & LPF 26 and the reference voltage level of the comparator 28 have to be set to predetermined values. In the former case, the possibility that the bottom envelope signal is saturated is high. In the latter case, the amplification degree and the reference level have to be fixed to predetermined values.

Only where a signal is amplified based on the center value thereof, the signal is not saturated and can be greatly amplified. Since the mirror signal detecting circuit 20 shown in FIG. 1 amplifies the bottom envelope signal according to a voltage level of the bottom hold signal, a center level of the amplified bottom envelope signal differs greatly from a comparison voltage level (slice level) of the comparator 28. Thus, the amplified bottom envelope signal cannot be properly sliced, as shown in FIG. 4D. Therefore, the comparator 28 cannot detect a proper mirror signal, as shown in FIG. 4E. Also, where the AMP & LPF 26 does not amplify a signal and the comparator 28 does not induce hysteresis to prevent this phenomenon, an inaccurate mirror signal is detected due to noise.

SUMMARY OF THE INVENTION

Accordingly, it is an aspect of the present invention to provide a mirror signal detecting circuit and a detecting method for an optical disc apparatus, which detects an accurate mirror signal during a high-speed seek.

Another aspect of the present invention is to provide a mirror signal detecting circuit and a detecting method for an optical disc apparatus, which detects an accurate mirror signal during a seek so as to cope with a high density disc or a poor disc.

Yet another aspect of the present invention is to provide a mirror signal detecting circuit and a detecting method for an optical disc apparatus, which detects an accurate mirror signal by amplifying a bottom envelope signal detected from a radio frequency signal, using a center level of the bottom envelope signal.

Additional aspects and advantages of the invention will be set forth in part in the description which follows and, in part, will be obvious from the description, or may be learned by practice of the invention.

To achieve the above and/or other aspects of the present invention, there is provided a mirror signal detection circuit for an optical disc apparatus having a servo that moves a pickup to a target track of a disc by using a mirror signal detected from a radio frequency signal picked up by the pickup, comprising a first detector which detects a bottom envelope of the radio frequency signal and provides a bottom envelope signal, a processor which amplifies the bottom envelope signal based on a center level of the bottom envelope signal, and a second detector which compares the amplified bottom envelope signal with a predetermined comparison voltage and detects the mirror signal.

The radio frequency signal may be an RFSUM signal that is a sum signal of signals picked up by the pickup, and the comparison voltage level may be set to a proper level that is within a range of a top level of the bottom envelope signal and a bottom level of the bottom envelope signal.

To achieve the above and/or other aspects of the present invention, there is a method of detecting a mirror signal for an optical disc apparatus which moves a pickup to a target track of a disc using the mirror signal detected from a radio frequency signal picked up by the pickup, the method comprising detecting a bottom envelope of the radio frequency signal and providing a bottom envelope signal, amplifying the bottom envelope signal based on a center value of the bottom envelope signal, and comparing the amplified bottom envelope signal with a predetermined comparison voltage and detecting the mirror signal.

The radio frequency signal may be an RFSUM signal that is a sum signal of signals picked up by the pickup, and the comparison voltage level may be set to a proper level that is within a range of the top level of the bottom envelope signal and the bottom level of the bottom envelope signal.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
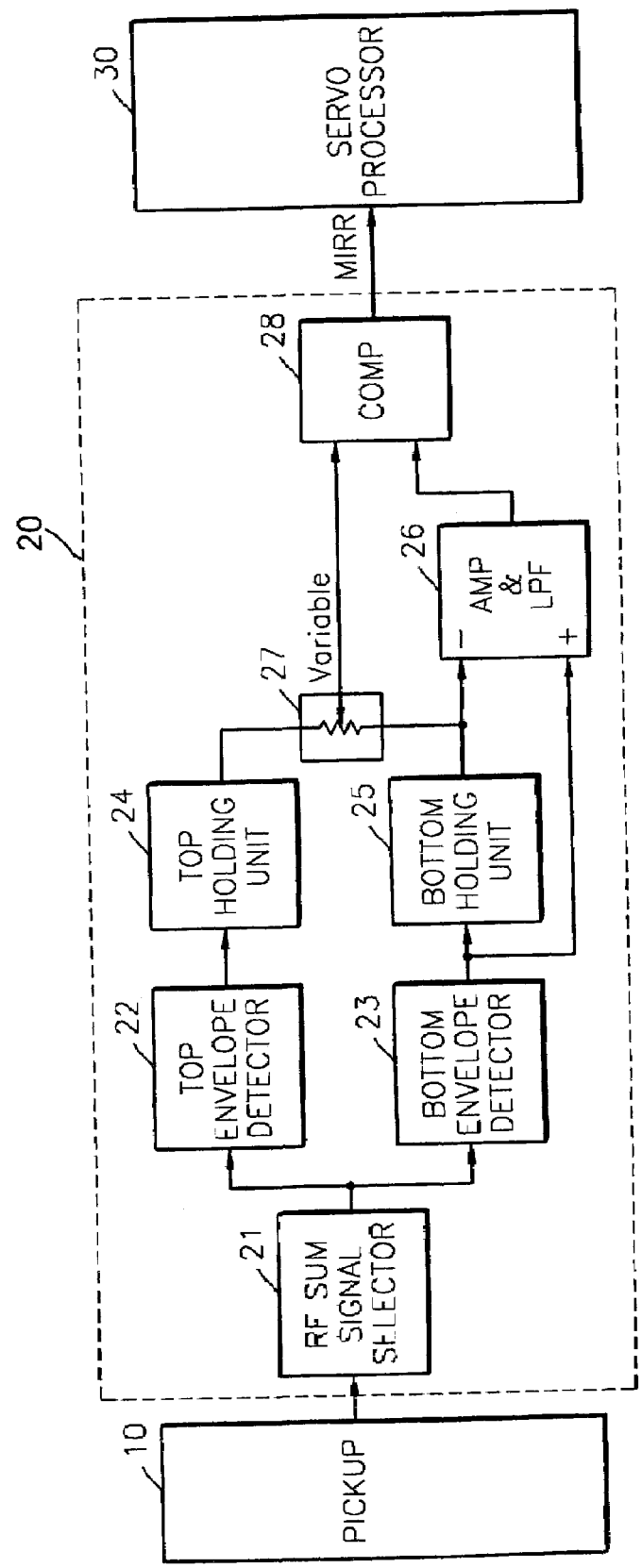
FIG. 1 is a block diagram of a conventional mirror signal detecting circuit for a known optical disc apparatus.
Figure 2A:
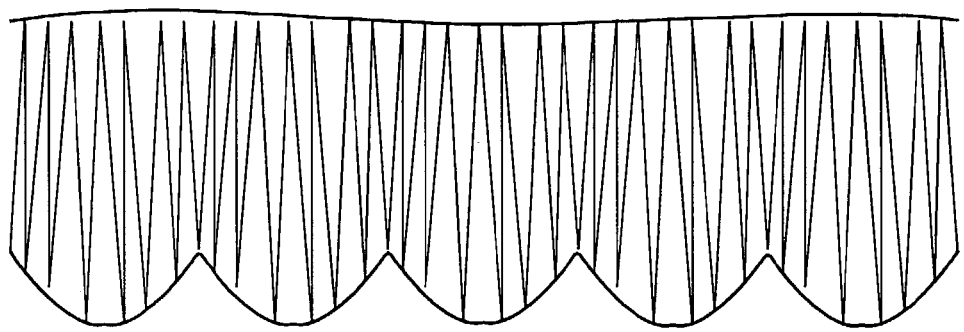
FIGS. 2A through 2F are views illustrating output waveforms of the mirror signal detecting circuit shown in FIG. 1.
Figure 2B:
Figure 2C:
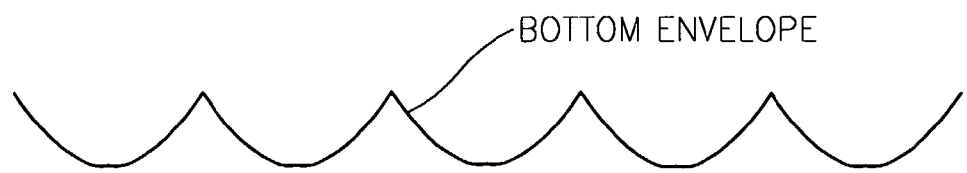
Figure 2D:
Figure 2E:
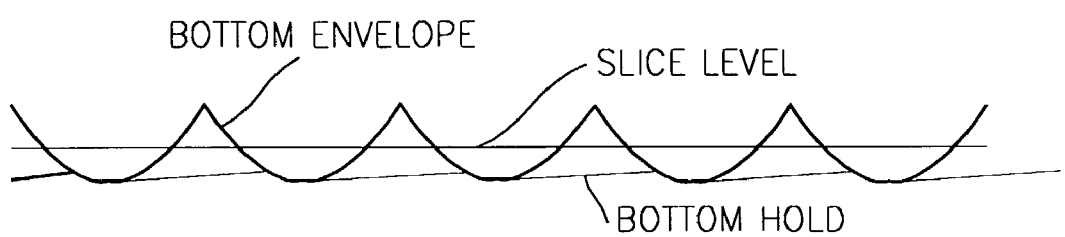
Figure 2F:
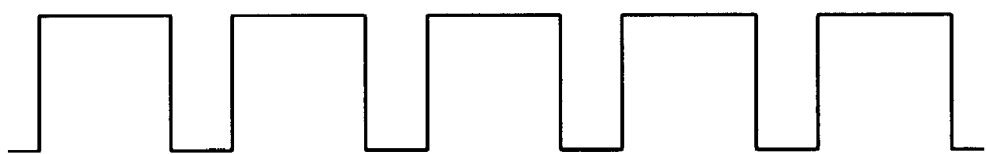
Figure 3A:
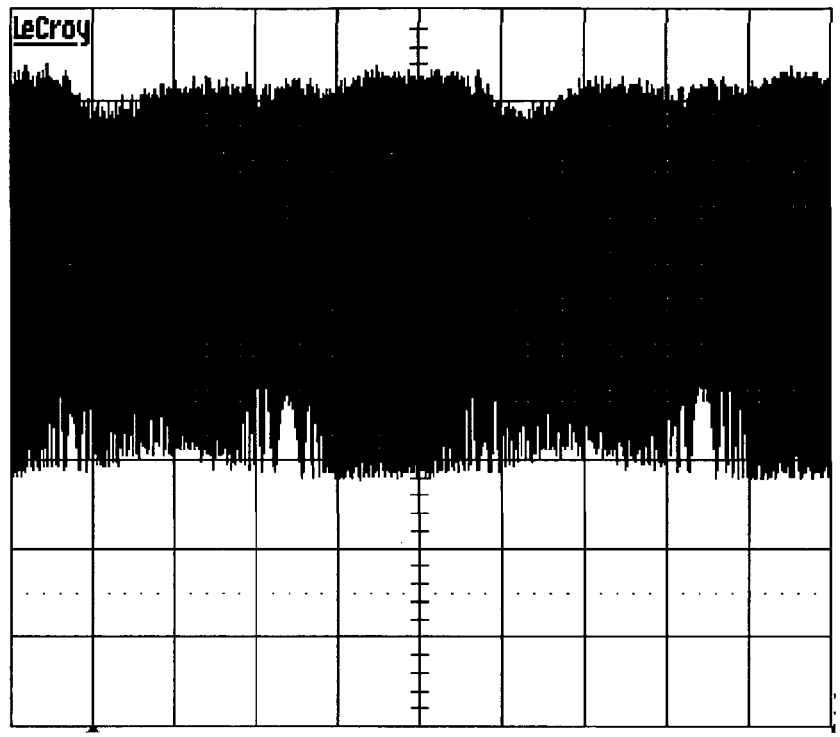
FIGS. 3A through 3D are views illustrating actual waveforms of a deteriorated RFSUM signal.
Figure 3B:
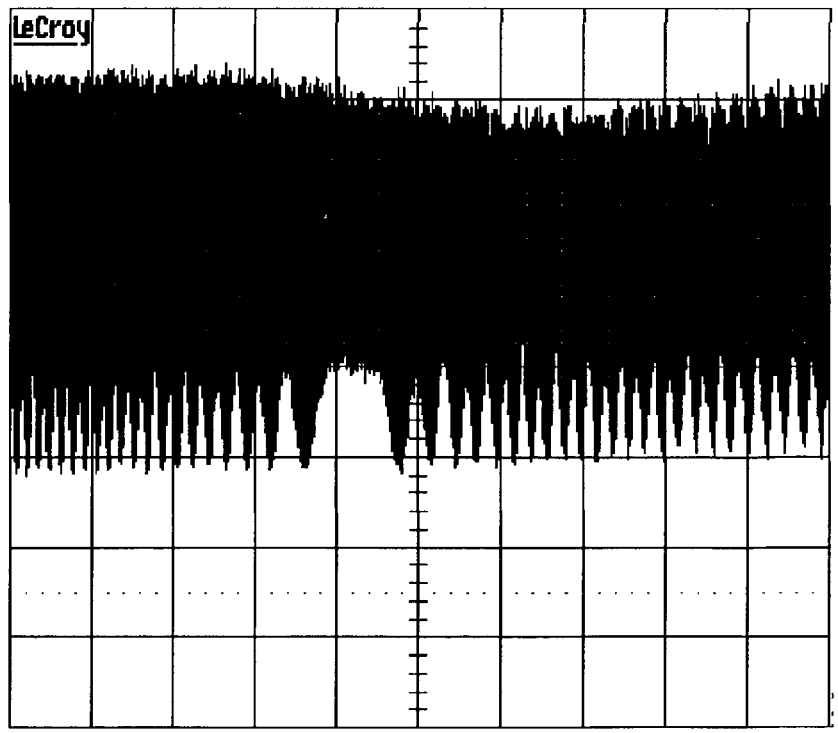
Figure 3C:
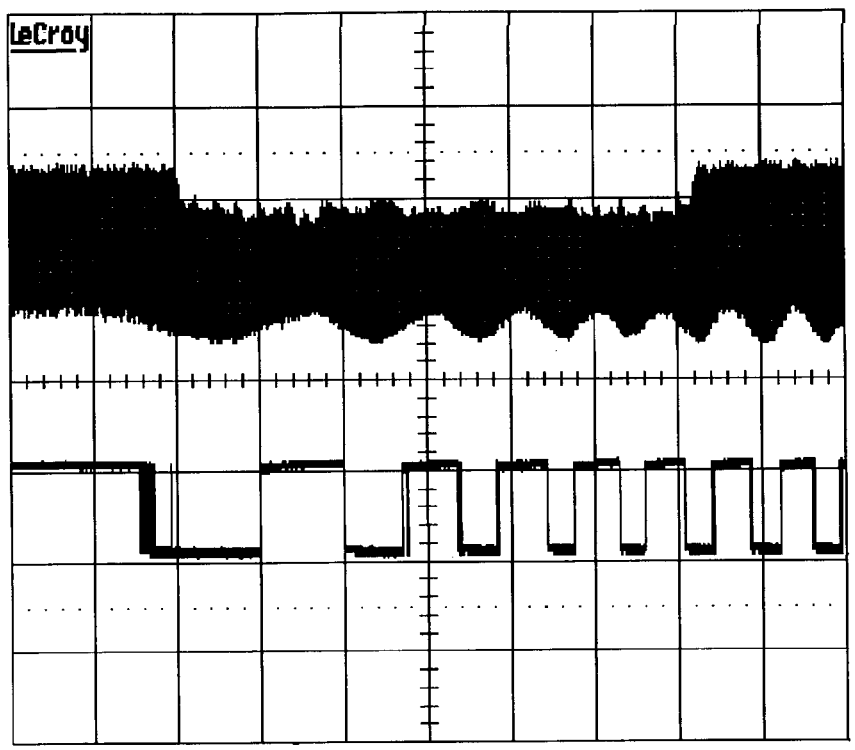
Figure 3D:
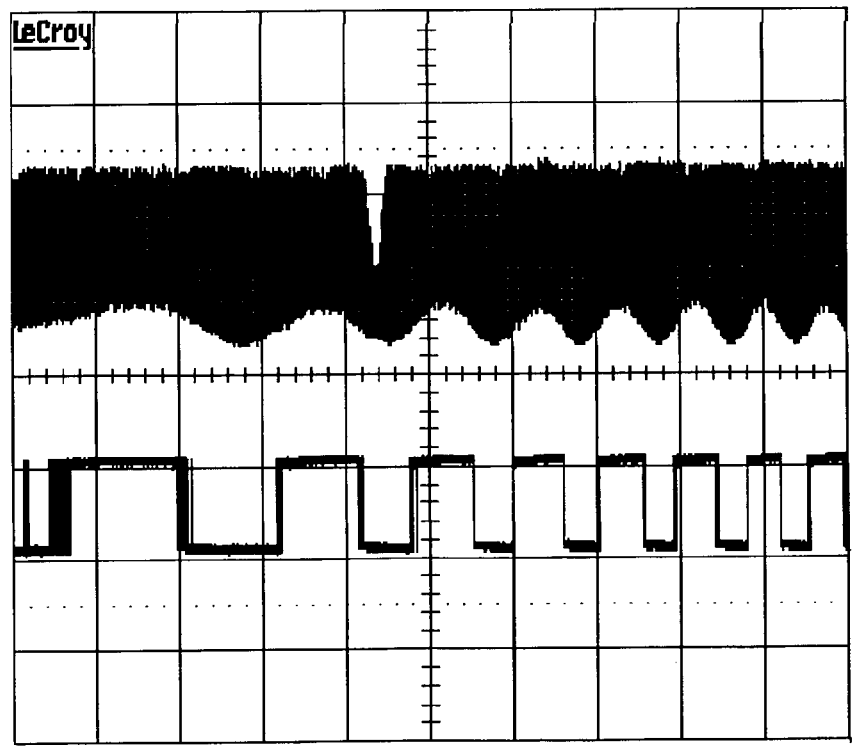
Figure 4A:
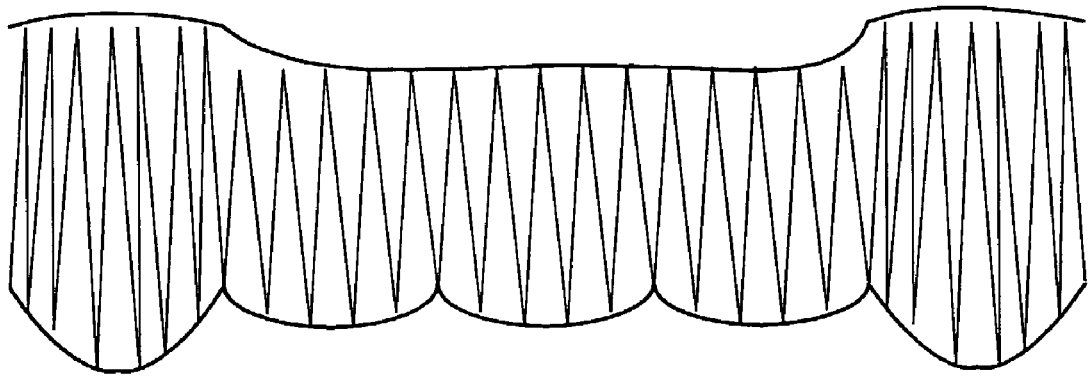
FIGS. 4A through 4E are views illustrating output waveforms of the mirror signal detecting circuit shown in FIG. 1 where a deteriorated RFSUM signal is input thereto.
Figure 4B:
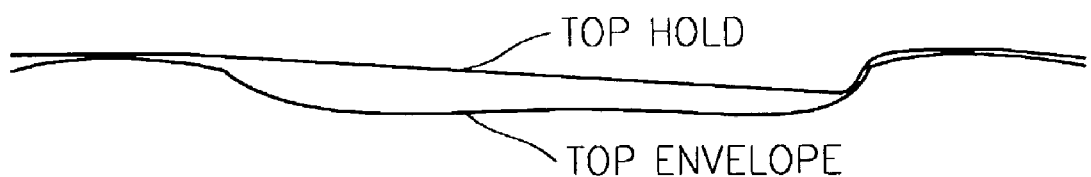
Figure 4C:
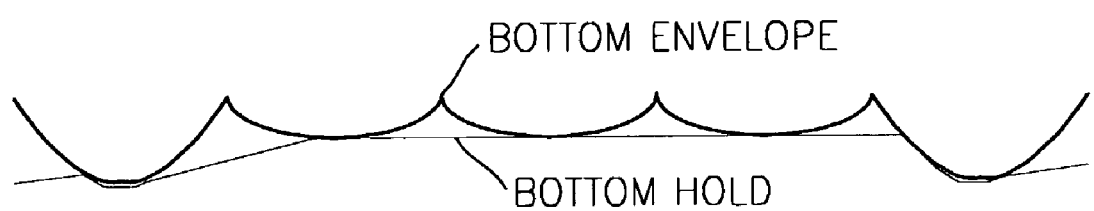
Figure 4D:
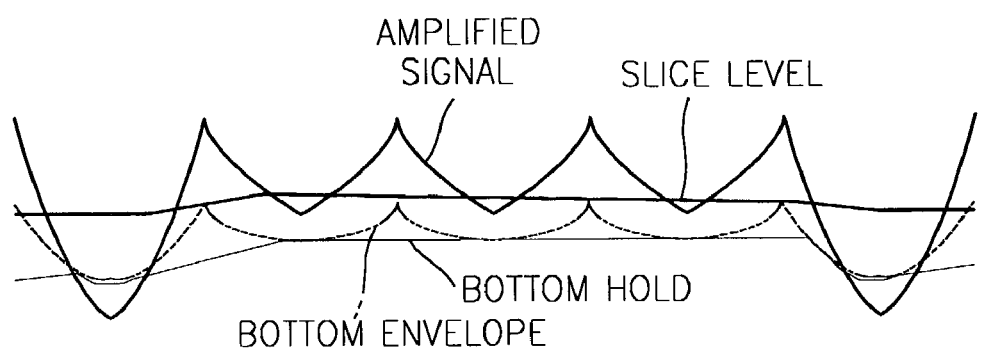
Figure 4E:
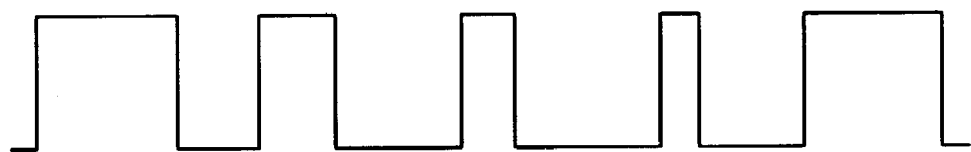

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
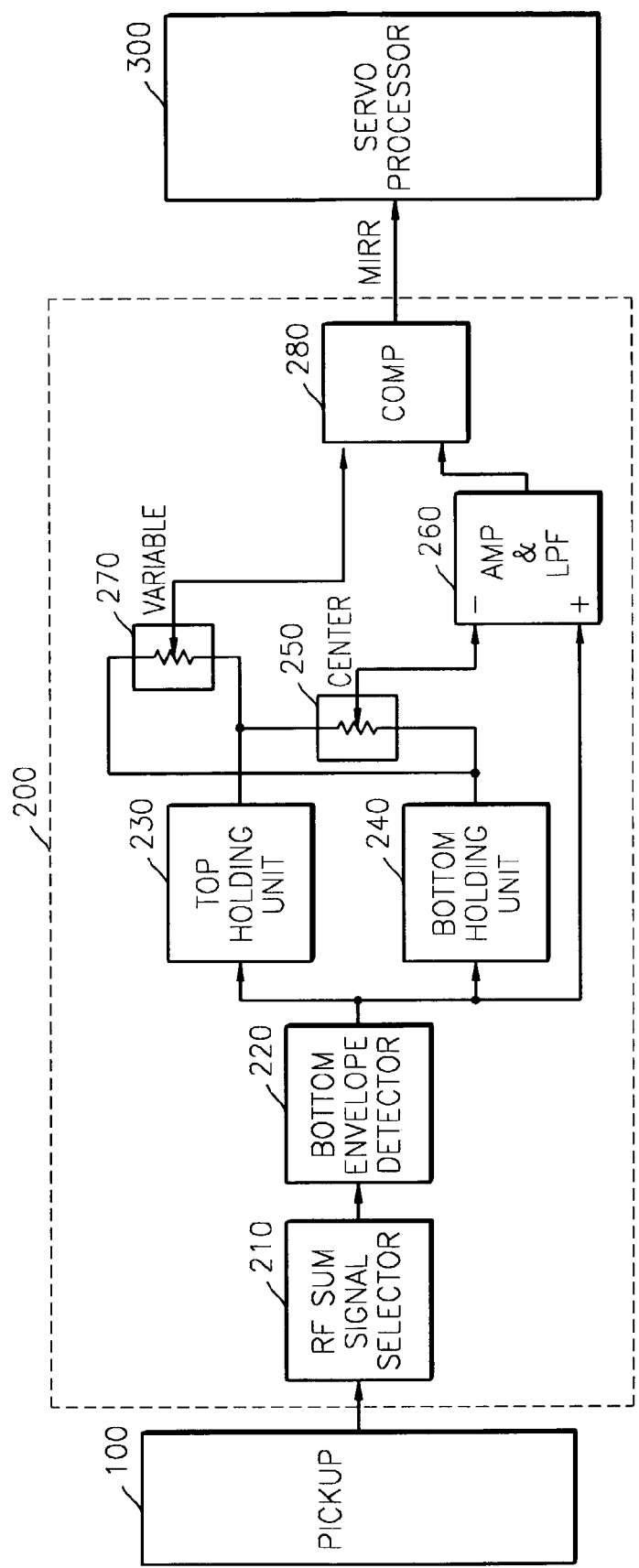
FIG. 5 is a block diagram of a mirror signal detecting circuit for an optical disc apparatus according to an embodiment of the present invention.

FIG. 5 shows a mirror signal detecting circuit for an optical disc apparatus according to an embodiment of the present invention. Referring to FIG. 5, a mirror signal detecting circuit 200 receives a signal that a pickup 100 picks up from an optical disc, on which data is recorded, for example, only on groove tracks, detects a mirror signal, and supplies the detected mirror signal to a servo processor 300.

The mirror signal detecting circuit 200 includes an RFSUM signal selector 210, a bottom envelope detector 220, a top holding unit 230, a bottom holding unit 240, a center level detector 250, an amplifier and low-pass filter (AMP & LPF) 260, a comparison voltage determiner 270, and a comparator (COMP) 280. The RFSUM signal selector 210 selects an RFSUM signal. The bottom envelope detector 220 detects a bottom envelope of the RFSUM signal and outputs a bottom envelope signal. The top holding unit 230 detects a top level of the bottom envelope signal. The bottom holding unit 240 detects a bottom level of the bottom envelope signal. The center level detector 250 detects a center level between the top level and the bottom level. The AMP & LPF 260 amplifies and low-pass filters the bottom envelope signal according to the center level. The comparison voltage determiner 270 determines the level of a comparison voltage. The comparator 280 compares the level of a voltage output from the AMP & LPF 260 with the level of the comparison voltage and outputs a mirror signal MIRR as a digital signal.

An operation of the mirror signal detecting circuit 200 shown in FIG. 5 will be described with reference to FIGS. 6A–6E.

Figure 6A:
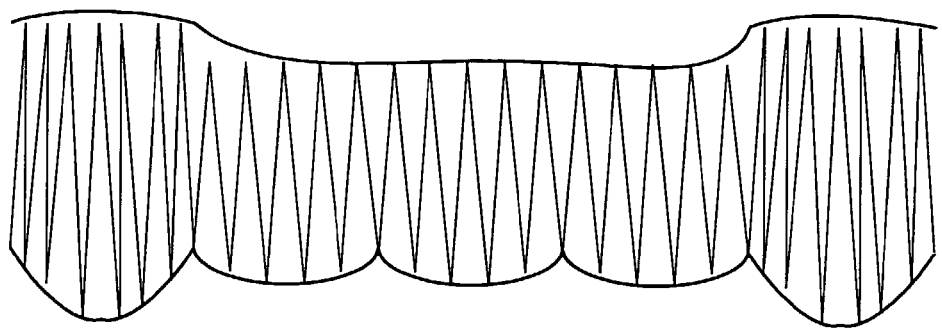
FIGS. 6A through 6E are views illustrating output waveforms of the mirror signal detecting circuit shown in FIG. 5.

The RFSUM selector 210 provides a signal picked up by the pickup 100 in a form of an RFSUM signal (as shown in FIG. 6A where the RFSUM signal is deteriorated) to the bottom envelope detector 220. In an event that the pickup 100 has a quadrant photodiode (not shown), the signal picked up by the pickup 100 may be an RFSUM signal that may be a signal expressed by a photodiode piece A on a left top, a photodiode piece B on a right top, a photodiode piece C on a right bottom, and a photodiode D on a left bottom, that is, a differential output signal of two channels (RFIN (+):(A+D)–(B+C); a difference signal between a sum signal of two electrical signals by the photodiode pieces A and D and a sum signal of two electrical signals by the photodiode pieces B and C, RFIN(−):(B+C)–(A+D); a difference signal between a sum signal of two electrical signals by the photodiode pieces A and D and a sum signal of two electrical signals by the photodiode pieces A and D), or a sum signal (A+B+C+D) of four channels.

Figure 6B:
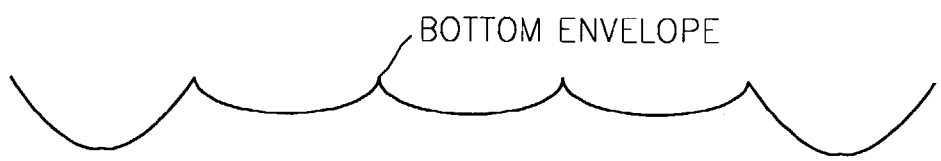
Figure 6C:
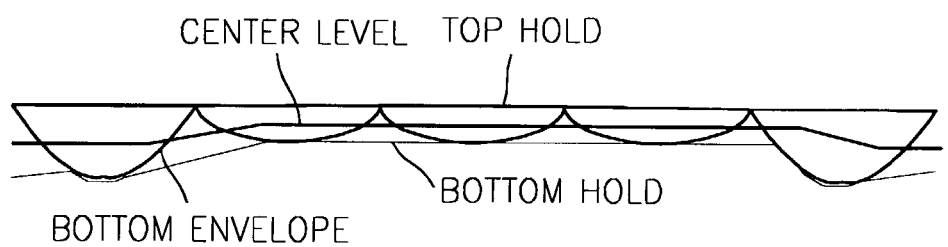

The bottom envelope detector 220 detects a bottom envelope of the RFSUM signal shown in FIG. 6A and outputs a bottom envelope signal as shown in FIG. 6B. Where the bottom envelope signal passes through the top holding unit 230 and the bottom holding unit 240, the bottom envelope signal is output as a top hold signal and a bottom hold signal shown in FIG. 6C. The center level detector 250 detects a center level between the top hold signal of the bottom envelope signal output from the top holding unit 230 and the bottom hold signal of the bottom envelope signal output from the bottom holding unit 240, as shown in FIG. 6C. The AMP & LPF 260 amplifies a signal according to a center value of a reference signal so as not to saturate the signal and greatly amplify the signal. Thus, the bottom envelope signal is amplified according to the center level of the bottom envelope signal detected by the center level detector 250.

In other words, the bottom envelope signal, shown in FIG. 6B, detected by the bottom envelope detector 220, is input to the AMP & LPF 260. A reference voltage level of the AMP & LPF 260 is the center level between the top hold signal and the bottom hold signal, shown in FIG. 6C, output from the center level detector 250. The AMP & LPF 260 amplifies and low-pass filters the bottom envelope signal according to the center level and outputs an amplified bottom envelope signal shown in FIG. 6D.

Figure 6D:
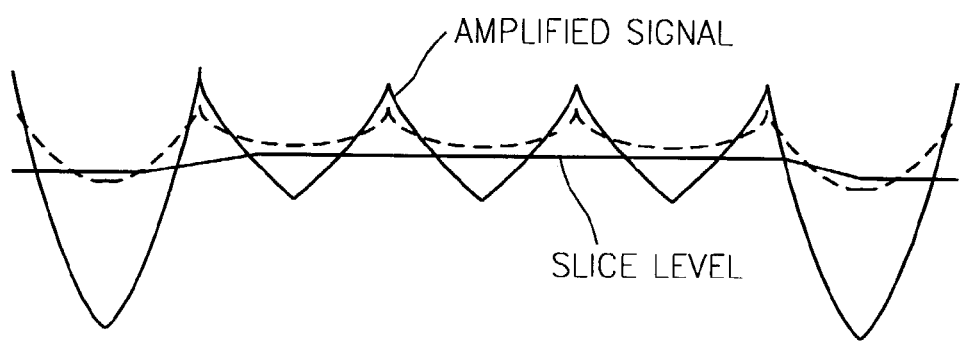
Figure 6E:
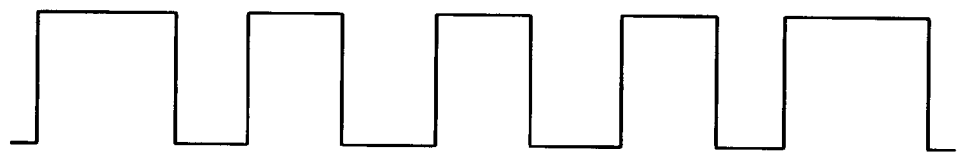

The comparison voltage determiner 270 controls a level of the top hold signal of the bottom envelope signal output from the top holding unit 230 and a level of the bottom signal of the bottom envelop signal output from the bottom holding unit 240 at predetermined levels and provides the predetermined levels as a comparison voltage of the comparator 280, i.e., a slice level shown in FIG. 6D. The level of the comparison voltage is set to a proper level that is within a range of the level of the top hold signal and the level of the bottom hold signal. The comparator 280 compares the amplified envelope signal output from the AMP & LPF 260 with a comparison voltage level provided from the comparison voltage determiner 270, detects a mirror signal MIRR of a digital signal shown in FIG. 6E, and outputs the mirror signal MIRR to the servo processor 300.

The servo processor 300 counts the number of tracks which are jumped in accordance with the mirror signal MIRR output from the mirror signal detecting circuit 200 in seeking or jumping tracks of a disc and generates a servo control signal necessary to move the pickup 100 to a target track. A servo driving unit (not shown) is driven based on the servo control signal of the servo processor 300 to move the pickup 100 to the target track. Here, the servo processor 300 and the servo driving unit may be referred to as a servo.

The present invention may be widely used in a servo signal processing of a recording and/or reproducing system of an optical disc.

As described above, in the present invention, by using data recorded on an optical disc, a mirror signal can be accurately detected during a high-speed seek. Also, misdetecting of a mirror signal due to noise can be reduced. Furthermore, an accurate mirror signal can be detected during a seek in order to cope with a high density disc and a poor disc (a disc that is deflected, eccentric, tilted, has a defect, or the like) or a defocused and deteriorated disc. As a result, the seek efficiency can be increased and the performance of a system using the same is improved.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mirror signal detection circuit for an optical disc apparatus having a servo which moves a pickup to a target track of a disc by using a mirror signal detected from a radio frequency signal picked up by the pickup, the circuit comprising:

a first detector which detects a bottom envelope of the radio frequency signal and provides a bottom envelope signal;

a processor which amplifies the bottom envelope signal based on a center level of the bottom envelope signal; and a second detector which compares the amplified bottom envelope signal with a predetermined comparison voltage and detects the mirror signal.

2. The circuit of claim 1, wherein the radio frequency signal is an RFSUM signal that is a sum signal of signals picked up by the pickup.

3. The circuit of claim 1, wherein the processor comprises:

a third detector which detects a top level of the bottom envelope signal;

a fourth detector which detects a bottom level of the bottom envelope signal;

a fifth detector which detects the center level between the top level and the bottom level; and an amplifier and low-pass filter which amplifies and low-pass filters the bottom envelope signal based on the center level, and provides the amplified and filtered result as the amplified bottom envelope signal.

4. The circuit of claim 3, wherein the second detector comprises:

a comparison voltage determiner which controls the top level of the bottom envelope signal output from the third detector and the bottom level of the bottom envelope signal output from the fourth detector, and determines a comparison voltage level; and a comparator that compares the amplified bottom envelope signal with the comparison voltage level and provides the mirror signal as a digital signal.

5. The circuit of claim 4, wherein the comparison voltage level is set to a proper level that is within a range of the top level of the bottom envelope signal and the bottom level of the bottom envelope signal.

6. A mirror signal detection circuit for an optical disc apparatus having a servo which moves a pickup to a target track of a disc by using a mirror signal detected from a radio frequency signal picked up by the pickup, the circuit comprising:

a bottom envelope detector which detects a bottom envelope of the radio frequency signal and provides a bottom envelope signal;

a top holding unit which holds the bottom envelope signal and detects a top level of the bottom envelope signal;

a bottom holding unit which holds the bottom envelope signal and detects a bottom level of the bottom envelope signal;

a center level detector which detects a center level between the top level and the bottom level;

an amplifier which amplifies the bottom envelope signal according to the center level;

a comparison voltage determiner which controls the top level and the bottom level of the bottom envelope signal and determines a comparison voltage level based on the top and bottom levels; and a comparator which compares the amplified bottom envelope signal with the comparison voltage level and provides the mirror signal as a digital signal.

7. The circuit of claim 6, wherein the radio frequency signal is an RFSUM signal that is a sum signal of signals picked up by the pickup.

8. The circuit of claim 6, wherein the comparison voltage level is set to a proper level that is within a range of the top level of the bottom envelope signal and the bottom level of the bottom envelope signal.

9. The circuit of claim 6, further comprising a low-pass filter which low-pass filters an output of the amplifier and provides the filtered result to the comparator so as to compare the amplified and filtered bottom envelope signal with the comparison voltage level.

10. A method of detecting a mirror signal for an optical disc apparatus which moves a pickup to a target track of a disc using the mirror signal detected from a radio frequency signal picked up by the pickup, the method comprising:

detecting a bottom envelope of the radio frequency signal and providing a bottom envelope signal;

amplifying the bottom envelope signal based on a center level of the bottom envelope signal; and comparing the amplified bottom envelope signal with a predetermined comparison voltage and detecting the mirror signal.

11. The method of claim 10, wherein the radio frequency signal is an RFSUM signal that is a sum signal of signals picked up by the pickup.

12. The method of claim 10, wherein the amplifying of the bottom envelope signal comprises:

detecting a top level of the bottom envelope signal;

detecting a bottom level of the bottom envelope signal;

detecting the center level between the top level and the bottom level; and amplifying and low-pass filtering the bottom envelope signal based on the center level, and providing the amplified and filtered result as the amplified bottom envelope signal.

13. The method of claim 12, wherein the comparing of the amplified bottom envelope signal and detecting of the mirror signal comprise:

controlling the top level and the bottom level of the bottom envelope signal and determining a comparison voltage level based on the top and bottom levels; and comparing the amplified bottom envelope signal with the comparison voltage level and providing the mirror signal as a digital signal.

14. The method of claim 13, wherein the determining of the comparison voltage level includes setting the comparison voltage level to a proper level that is within a range of the top level of the bottom envelope signal and the bottom level of the bottom envelope signal.

15. A method of detecting a mirror signal from a radio frequency signal picked up by a pickup of an optical disc apparatus to move the pickup to a target track of a disc using the mirror signal, the method comprising:

detecting a bottom envelope of the radio frequency signal and providing a bottom envelope signal;

detecting a top level and a bottom level of the bottom envelope signal;

detecting a center level between the top level and the bottom level;

amplifying the bottom envelope signal based on the center level;

controlling the top level and the bottom level of the bottom envelope signal and determining a comparison voltage level, used as a slice level, based on the top and bottom levels; and comparing the amplified bottom envelope signal with the comparison voltage level and providing the mirror signal as a digital signal.

16. The method of claim 15, wherein the radio frequency signal is an RFSUM signal that is a sum signal of signals picked up by the pickup.

17. The method of claim 15, wherein the determining of the comparison voltage level includes setting the comparison voltage level to a proper level that is within a range of the top level of the bottom envelope signal and the bottom level of the bottom envelope signal.

18. The method of claim 15, further comprising low-pass filtering the amplified bottom envelope signal so as compare the amplified and filtered bottom envelope signal with the comparison voltage level.

19. The circuit of claim 1, wherein the mirror signal is used to move the pickup to the target track during a seeking or jumping track operation.

20. A mirror signal detection unit for an apparatus having a servo which moves a pickup to a target track of a storage medium by using a mirror signal detected from a radio frequency signal picked up by the pickup, comprising a processor which determines the mirror signal by amplifying a bottom envelope signal detected from the radio frequency signal, using a center level of the bottom envelope signal.

21. The mirror signal detection unit of claim 20, wherein the mirror signal detection unit is a mirror signal detection circuit which amplifies the bottom envelope signal based on the center level of the bottom envelope signal and detects the mirror signal based on a comparison of the amplified bottom envelope signal with a predetermined comparison voltage.

22. The mirror signal detection unit of claim 21, wherein the mirror signal detection circuit amplifies and low-pass filters the bottom envelope signal based on the center level, and utilizes the amplified and filtered result as the amplified bottom envelope signal.

23. The mirror signal detection unit of claim 20, wherein the predetermined comparison voltage is set to a proper level that is within a range of a top level of the bottom envelope signal and a bottom level of the bottom envelope signal.

24. A mirror signal detection circuit for an apparatus having a servo which moves a pickup to a target track of a storage medium by using a mirror signal detected from a radio frequency signal picked up by the pickup, the circuit comprising:

a processor which amplifies a bottom envelope signal of the radio frequency signal based on a center level of the bottom envelope signal; and a detector which detects the mirror signal based on a comparison of the amplified bottom envelope signal with a predetermined comparison voltage.

25. An apparatus for operating a storage medium, comprising:
    a pickup which detects a radio frequency signal of the storage medium;
    a mirror signal detection unit which detects a mirror signal from the radio frequency signal, wherein the mirror detection unit includes:
        a first detector which detects a bottom envelope of the radio frequency signal and provides a bottom envelope signal,
        a processor which amplifies the bottom envelope signal based on a center level of the bottom envelope signal, and
        a second detector which compares the amplified bottom envelope signal with a predetermined comparison voltage and provides the mirror signal; and
    a servo which moves the pickup to a target track according to the mirror signal.

26. The apparatus of claim 25, wherein the processor includes an amplifier and low-pass filter which amplifies and low-pass filters the bottom envelope signal based on the center level, and provides the amplified and filtered result as the amplified bottom envelope signal.

27. The apparatus of claim 25, wherein the mirror signal detection unit is realized as a mirror signal detection circuit.

28. The apparatus of claim 25, wherein the second detector provides the mirror signal as a digital signal.

29. The apparatus of claim 25, wherein the predetermined comparison voltage is set to a proper level that is within a range of a top level of the bottom envelope signal and a bottom level of the bottom envelope signal.

30. An apparatus for operating a storage medium, comprising:
    a pickup which detects a radio frequency signal of the storage medium;
    a mirror signal detection unit which amplifies a bottom envelope signal of the radio frequency signal based on a center level of the bottom envelope signal, and provides a mirror signal based on a comparison of the amplified bottom envelope signal with a predetermined comparison voltage; and
    a servo which moves the pickup to a target track according to the mirror signal.

31. The apparatus of claim 30, wherein the mirror signal detection unit is realized as a mirror signal detection circuit.

32. An apparatus for operating a storage medium, comprising:
    a pickup which detects a radio frequency signal of the storage medium;
    a mirror signal detection unit which detects a mirror signal by amplifying a bottom envelope signal detected from the radio frequency signal, using a center level of the bottom envelope signal; and
    a servo which moves the pickup to a target track according to the mirror signal.

* * * * *